(12) United States Patent
Sah et al.

(10) Patent No.: US 9,224,149 B2
(45) Date of Patent: Dec. 29, 2015

(54) EXTERNAL REFERENCING BY PORTABLE PROGRAM MODULES

(75) Inventors: Adam Sah, Santa Cruz, CA (US); Deepak Jindal, San Francisco, CA (US); Christian Oestlien, San Francisco, CA (US)

(73) Assignee: Google Inc., Mountain View, CA (US)

( * ) Notice: Subject to any disclaimer, the term of this patent is extended or adjusted under 35 U.S.C. 154(b) by 1031 days.

(21) Appl. No.: 11/872,615

(22) Filed: Oct. 15, 2007

(65) Prior Publication Data

US 2009/0099901 A1    Apr. 16, 2009

(51) Int. Cl.
*G06Q 30/02* (2012.01)
*G06F 17/30* (2006.01)

(52) U.S. Cl.
CPC .......... *G06Q 30/02* (2013.01); *G06F 17/30017* (2013.01); *G06Q 30/0277* (2013.01)

(58) Field of Classification Search
CPC .............. G06Q 30/0251; G06Q 30/02; G06Q 30/0277; G06Q 17/30017
USPC .................. 705/14.49, 14.71, 14.73; 715/209
See application file for complete search history.

(56) References Cited

U.S. PATENT DOCUMENTS

| | | | |
|---|---|---|---|
| 7,831,586 B2 * | 11/2010 | Reitter et al. .................. | 707/709 |
| 8,001,105 B2 * | 8/2011 | Bolivar et al. .................. | 707/709 |
| 8,200,662 B2 * | 6/2012 | Reitter et al. .................. | 707/722 |
| 2002/0184186 A1 * | 12/2002 | Imaichi et al. ..................... | 707/1 |
| 2004/0193580 A1 | 9/2004 | Martin et al. | |
| 2005/0154746 A1 | 7/2005 | Liu et al. | |
| 2005/0192948 A1 | 9/2005 | Miller et al. | |
| 2005/0262428 A1 * | 11/2005 | Little et al. ................... | 715/501.1 |
| 2006/0190439 A1 * | 8/2006 | Chowdhury et al. ............. | 707/3 |
| 2006/0259372 A1 * | 11/2006 | Perrier et al. .................... | 705/26 |
| 2007/0100801 A1 * | 5/2007 | Celik et al. .......... | 707/3 |
| 2007/0124200 A1 * | 5/2007 | Simons et al. .................. | 705/14 |
| 2007/0174258 A1 | 7/2007 | Jones et al. | |
| 2007/0288431 A1 * | 12/2007 | Reitter et al. ..................... | 707/3 |
| 2007/0288454 A1 * | 12/2007 | Bolivar et al. ..................... | 707/5 |
| 2007/0288514 A1 * | 12/2007 | Reitter et al. ............... | 707/104.1 |
| 2008/0004956 A1 * | 1/2008 | Atherton et al. ................ | 705/14 |
| 2008/0086368 A1 * | 4/2008 | Bauman et al. ................ | 705/14 |
| 2008/0091526 A1 * | 4/2008 | Shoemaker ..................... | 705/14 |
| 2011/0055195 A1 * | 3/2011 | Reitter et al. ................. | 707/710 |

FOREIGN PATENT DOCUMENTS

AU    2007206022    7/2007
EP    1681653 A1 *    7/2006
(Continued)

OTHER PUBLICATIONS

International Search Report & Written Opinion for Application No. PCT/US2008/080006, dated Jun. 17, 2009, 11 pages.

(Continued)

*Primary Examiner* — Cesar Paula
*Assistant Examiner* — Tyler J Schallhorn
(74) *Attorney, Agent, or Firm* — Fish & Richardson P.C.

(57) ABSTRACT

A computer-implemented method includes storing at a computer server indicative data for a first web-accessible document that is not associated with the computer server, receiving a request from a program module in a container document associated with the web-accessible document, and providing, in response to the request, information related to the indicative data.

29 Claims, 9 Drawing Sheets

(56) References Cited

FOREIGN PATENT DOCUMENTS

| | | |
|---|---|---|
| JP | 2004-054918 | 2/2004 |
| KR | 10-2007-0029389 | 3/2007 |

OTHER PUBLICATIONS

Office Action issued in Chinese Application No. 201210016425.2 on Sep. 3, 2014, 16 pages (with English translation).

\* cited by examiner

EXTERNAL REFERENCING BY PORTABLE PROGRAM MODULES

TECHNICAL FIELD

This document discusses mechanisms and techniques for incorporating information into portable program modules, which may include the generation of gadget advertisements using real-time information feeds.

BACKGROUND

Targeted web advertising has become a very successful business for companies like Google. Such advertising is a success for much the same reason certain search engines are a success—it brings users information that is relevant to them. Advertising is typically provided along with search results, often in an area separate from the actual results themselves. In such a situation, the advertisements selected for display may be matched to terms in the search request. The Google Adwords service is an example of such targeted advertising. Targeted advertisements may also be delivered apart from search, such as on web pages themselves. For example, an ad system may analyze the content of a web page to determine important words or concepts to associate with the page, and may deliver ads directed to those words or concepts when the page is displayed. Such delivery may occur when the page is retrieved for a user, with the host of the page delivering the page content and the ad server delivering the targeted advertising. The Google AdSense service is an example of such targeted advertising.

SUMMARY

This document describes mechanisms and techniques that may be employed to provide information from external sources to web-based documents such as web pages. For example, a web page or a program may act as a container document for a portable program module such as a gadget. The gadget may be programmed to identify information about the container document, to pass such information to an ad server, to receive targeting information back from the ad server, and to supply the targeting information to a server separate from the ad server. The gadget may then create an advertisement for display using information returned from the separate server. In one example, the gadget may generate an ad that is targeted to a page and includes real-time information from an on-line auction service such as eBay.

In one implementation, a computer-implemented method is disclosed. The method includes storing at a computer server indicative data for a first web-accessible document that is not associated with the computer server, receiving a request from a program module in a container document associated with the web-accessible document, and providing, in response to the request, information related to the indicative data. The web-accessible document can comprise the container document, and the indicative data can comprise keywords associated with textual content on the web-accessible document. In some aspects, the information related to the indicative data includes at least a portion of the indicative data. Also, the information about the web-accessible document can include a URL of the web-accessible document. In addition, the method can also comprise analyzing the web-accessible document to determine keywords for the document.

In another implementation, a computer-implemented method is disclosed. The method comprises obtaining information for identifying a container document with a portable program module located in the container document, submitting the information to a concept server storing information about the container document, and receiving in response information associated with the container document, and submitting a query to an item search server related t the information associated with the container document. The method can also comprise receiving in response to the query actively updated information about one or more items, and generating a display on the container document relating to the one or more items. In some aspects, the actively updated information comprises status information for on-line auctions, and the display comprises one or more hyperlinks.

In certain aspects, the method further comprises receiving a selection of one of the one or more hyperlinks and causing a web page associated with the hyperlink to be displayed. Also, hyperlink can include a query for the return of content that changes in real time. In addition, the display can comprise a targeted advertisement, and the method can further include receiving a selection of one of the one or more hyperlinks and reporting a click event to an advertising server. Moreover, the method can also comprise determining a size of the display and formatting the information about one or more items to be displayed in the display. The information for identifying a container document can comprise a URL associated with the container document, and the information associated with the container document can include one or more key words representing concepts in text on the container document. In certain aspects, the method also comprises generating the query from a subset of the one or more key words.

In yet another embodiment, a recordable media is disclosed. The media has recorded and stored thereon in tangible form, instructions that, when executed, perform actions comprising obtaining information for identifying a container document with a portable program module located in the container document, submitting the information to a concept server storing information about the container document, and receiving in response information associated with the container document, and submitting a query to an item search server related to the information associated with the container document.

In another embodiment, a computer-implemented system includes a web-accessible container document for display by a client application, and an advertising portable program module for display on the container document. The advertising portable program module includes computer code to identify context information of the container document, to submit the context information associated with the context information to an advertising server, to submit advertising keyword information to a third-party server, and to generate an advertisement using information returned from the third party server.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
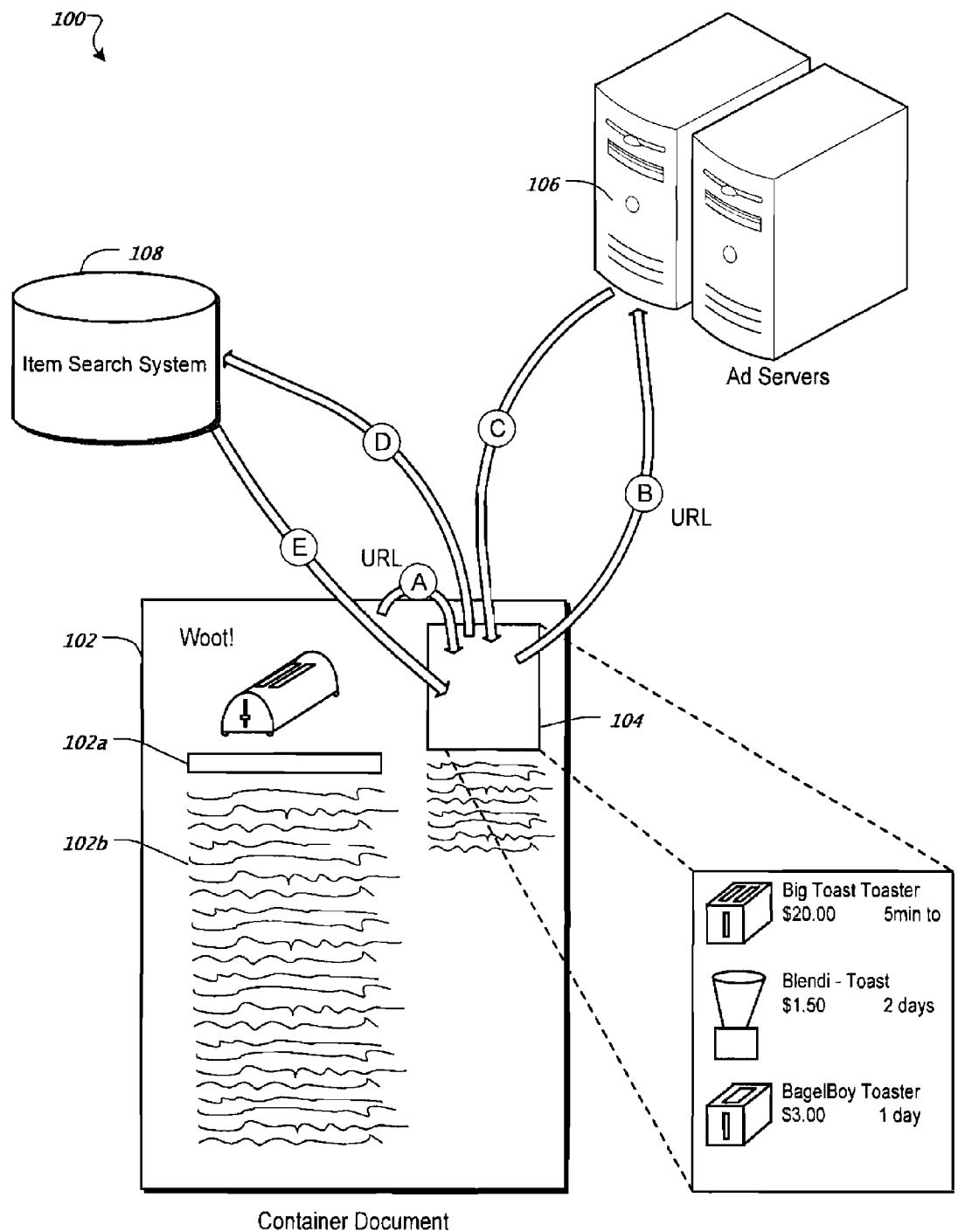
FIG. 1 shows a conceptual diagram of a system and process for delivering real time information to a portable program module.

FIG. 1 shows a conceptual diagram of a system 100 and process for delivering real time information to a portable program module. In the pictured example, the system 100 comprises a portable program module 104 (such as a web gadget), advertising servers 106, and an item search system 108. In general, these components cooperate to permit advertisements or other such displays containing real-time or near real-time data to be constructed and displayed to a user at run-time. As such, a targeted advertisement may be constructed on the fly, and may thus contain information that is currently relevant to the user. In this example, that information is status information about one or more on-line auctions relating to content of a web page.

In addition, in certain implementations, the system 100 may be implemented with few or no adjustments to existing systems. For example, the portable program module 104 may be programmed to submit standard HTTP requests to the advertising servers 106 and item search system 108 using agreed-upon API's that are the same as requests made by other systems. As such, the functionality described here may be added to a system without having to update server software or make other similar changes. In addition, such a system 100 may provide additional flexibility, where authors and user of portable program modules may have more control over the manner in which their systems interact with advertising servers 106 and item search system 108.

Such techniques may, in certain implementations, provide one or more advantages. For example, in this example, a page may be able to provide viewers with up-to-date real-time information that may be particularly relevant to a user. For example, if the user is simply provided with information about an area on an auction site, with a mere indication that there might be relevant auctions happening at the site, the user will be reticent to click through to review the auction because the clicking may be a waste of time. On the other hand, if the user sees an actual product in an auction that will expire soon, and sees its current price, the likelihood that the user will click on the ad should go up substantially.

The example implementation may have advantages to users, to advertisers, to advertising carriers, and to information providers. Users gain because they are provided with information that is more relevant to them. Advertisers gain because they can drive more viewers to their goods. Advertising carriers, such as Google, gain because the advertisers that they serve gain. And information providers—the owners of the documents that contain the gadget ads—gain because their viewers gain, and perhaps because they can obtain a share of the advertising revenue.

Referring to FIG. 1, a portable program module 104 is shown located in a container document 102. The portable program module 104 may include a display that is generated from mark-up code that is stored as part of, or referenced from, mark up code that generates the container document 102. For example, the mark up code may include various forms of HTML code, such as code for generating a gadget on the display. The portable program module 104 may be part of an Frame on a web page that is represented by the container document 102. In general, an Frame is an HTML document that may be embedded in another HTML document, using an iFrame element. The document in which the Frame is embedded—the container document 102 in this example—may be generated around the iFrame while the iFrame itself is still being generated.

Example HTML code for providing an iFrame in a web page includes the following:

```
<html>...
    <iframe src="http://makinganiframe.com" height="100"
    width="200" frameborder="0" scrolling="no">
    </iframe>
    ....
</html>
```

As this code shows, the iFrame element may reference a document to be inserted in the iFrame, dimensions for the iFrame, and whether scrolling should be allowed inside the iFrame. The document in the iFrame can be replaced with another document or can be modified or refreshed without refreshing the container document (e.g., the surrounding page), by using the "target" attribute of an HTML anchor or by using JavaScript, such as in an AJAX implementation. Similar displays may be generated, for example, through editing of a document's DOM tree.

The portable program module 104 may communicate with the container document 102, with advertising servers 106, and with the item search system 108. The container document may display a variety of information, and in this case, displays a heading 102a and body text 102b. The container document 102 is also represented by a URL that can be used by the portable program module 104 and other internet-connected components and systems to identify the container document.

The portable program module 104 may in effect perform textual analysis of the container document 102 using the advertising servers 106. The advertising servers may be servers that include components that crawl various web sites and analyze the content of those web sites. In particular, the textual content of web pages may be gathered and a list of terms on the page may be generated and ordered from most common terms to least common terms. This list of terms may then be submitted to an expert system that has been trained with other terms and that associates various concepts with those terms. From such analysis, particular concepts associated with the web page may be determined, and such concepts may be used (as described further below) by the portable program module 104 in queries to obtain additional information from third-parties for processing by and display by the portable program module 104.

The portable program module 104 may access such information by making a properly formatted request of the advertising servers 106. This request may identify to the advertising servers the information that is needed by providing the ad servers 106 with identifying information for the container document 102, such as the URL for the container document 102. To obtain the URL, the portable program module 104 may use javascript on the page that executes on the page so that it may get the URL by document.location. If the javascript is running inside an ad frame, it can use a document.referrer to get a URL for the content page. The javascript may then create an iframe that requests an ad from an adserver, which may then return a gadget with an appropriate URL filled in. The portable program module 104 may then submit the URL to the ad servers 106 by making an HTTP request, such as a request formatted as follows:

http://pagead2.googlesyndication.com/pagead/ ads?url=slashdot.org&output=xml&num_radlinks=10

The ad servers 106 are configured to receive requests relating to particular URLs and to provide in response key words that are descriptive of content associated with the URLs. The ad servers 106 may be configured simply to perform a look up in response to receiving a URL, or may identify additional data associated with a received URL before returning descriptive information. The ad server 106 can look up a crawled copy of the page and conduct a contextual analysis as described above, and depending on the context, keywords or ads as required. For geographic information, the servers 106 can look up an IP address related to the request in a geographic database.

Upon receiving the descriptive information, the portable program module 104 may submit the received information, a subset of the information, or information relating to the received information to the item search system (ISS) 108. The item search system 108 may take a variety of forms, but in this example is a server that maintains changing real time information, such as weather, stock price, or auction information. One example of such a system is the eBay auction web site. The item search system 108 may operate so as to receive queries via published, open protocols, so that a developer of portable program module 104 may readily communicate queries via the portable program module 104 using the received descriptive information. The item search system 108 may then respond in a known manner, such as by transmitting XML formatted information about activity tracked by the item search system. For example, the item search system 108 may provide descriptive information about top objects in an auction that is associated with the query passed to it, such as descriptions, photos, current prices, and time to expiration.

An example flow of operations in system 100 is shown by lettered arrows in FIG. 1. In this particular example, the container document 102 is a web page for an on-line shopping site that lists one product for sale each day, and stops selling anything when that product runs out. As such, the operator of the web site may be missing opportunities to generate revenue in the time—perhaps hours—each day when nothing is available from the site. At the same time, the operator may not want to have to manage other sales, apart from the single product each day.

To assist with this challenge, the operator may include portable program module 104 in the container document 102, and may provide code so that the portable program module 104 is enabled only after product advertised on the container document 102 has become exhausted. Until that time, various other information may be displayed in the iFrame for portable program module 104, such as real-time discussions by users about the product being sold on the page.

When the portable program module 104 is accessed, such as when a user is provided with mark up code when accessing the container document 102, the code for the container document 102 may first begin to be executed, and the container document 102 displayed. When the processing reaches the iFrame code for the portable program module 104, code for the portable program module 104 may be accessed and executed. That code may include an element for accessing information about the container document, such as the URL for the container document, and the dimensions provided in the container document for the iFrame. Arrow A shows a request from the portable program module 104 to the container document 102 to obtain a certain information about the container document 102.

The portable program module 104 may then may a request, such as in the form of an HTTP request, to the ad servers 106 to obtain additional information about the container from the ad servers 106. Such a request is shown by Arrow B. The request may include some or all of the information obtained from the container document, in either its original form or in a modified form. For example, the request may include the URL for the container document. The request may also include other information, such as the IP address of the user, and any other parameters that the publisher is willing to have passed, such as user demographics and the like.

The request from the portable program module 104 to the ad servers 106 may optionally be encrypted or otherwise protected from tampering. For example, a unique protocol may be agreed upon between portable program module 104 and ad servers 106 to prevent illegitimate requests for information from ad servers 106.

Upon receiving such a request, the ad servers 106 may perform a variety of operations in generating a response to the request. In the pictured example, the ad servers 106 are tasked with providing the portable program module 104 with information that is descriptive of the container document 102. The ad servers 106 or other servers associated with the ad servers 106 may have previously generated such descriptive information, such as by the techniques described above. If such information already exists, the ad servers 106 may simply return it to the portable program module 104. If the ad servers 106 do not yet have descriptive information for the container document 102, they may attempt to generate such information in real time. For example, they may cause a spider module to access the container document 102 to obtain content from the container document 102 (e.g., the text of a web page along with tags that may indicate the relative importance of the text, such as heading tags), and may extract keywords from the content. Such keywords may then be stored by the ad servers 106 for later use and may also be transmitted back to the portable program module 104.

If the ad servers 106 cannot obtain information that is directly descriptive of the container document 102, then they may attempt to generate a best guess for such information. For example, the ad servers 106 may obtain keywords for other documents at the same domain as the container document 102. The ad servers 106 may then create keywords that are, for example, a ranked union of keywords for other documents that are "near" the address of the container document 102. In one example, documents that are closest to the container document 102 (e.g., those in the same path) may be given higher weight than more distant documents when determining appropriate descriptive information to deliver for the container document 102.

When the descriptive information for the container document 102 is determined by the ad servers 106, it may be returned to the portable program module 104, as shown by Arrow C. For example, the information may be provided in an XML formatted message or other similar message format.

Upon receiving the information from the ad servers 106, the portable program module 104 may submit the information in a query to the item search system 108, as shown by Arrow D. Such an action may simply include inserting keywords received from the ad servers 106 as arguments in a query. Such action may also involve additional steps. For example, the portable program module 104 may make a determination that certain information received from ad servers 106 will not result in a satisfactory result from the item search system 108. As one example, the portable program module 104 may receive too many keywords for the item search system 108, and may be programmed to remove certain of the keywords (e.g., the last-received keywords).

The information returned from the ad servers 106 to the portable program module 104 may include information in addition to the descriptive information. For example, the ad servers 106 may determine, by analyzing the descriptive information, that a particular item search system 108, from among many item search systems, may be more appropriate for providing content to the portable program module 104. As one example, where keywords returned to portable program module 104 relate to consumer-directed terminology (e.g., DVD, television, collectibles), the ad servers 106 may provide a parameter so that the portable program module 104 sends a query to a server associated with eBay. On the other hand, if the key words indicate that the user is likely to be looking at a more industrial document (e.g., steel, billet, CRM, etc.), then the portable program module 104 may be directed to an industrial-focused auction site. In this manner, the advertisement shown as a result of the process may be particularly tailored, and also may be directed to a site most likely to give complete and useful results.

In response to a submission by the portable program module 104, the item search system 108 may return results for the query. For example, through a standard API, the item search system 108 may reformat the query for submission to a database, such as a database tracking auction status in real time (which includes near real time). The results, may include listings of ongoing auctions, like a user would see if they typed the relevant keywords into a home page of an auction site such as eBay. The item search system 108 may return a certain number of results (e.g., in response to a parameter received from the portable program module 104), such as the top three results (e.g., three closest results or the three auctions that are about to expire) to the portable program module 104, as shown by Arrow E. The results may be formatted, for example, as an XML message. An example of a message returned from the item search system 108 to the portable program module 104 may take the following form:

Upon receiving the results from the item search system 108, the portable program module 104 may analyze and format the results for display to a user on the web page represented by the container document 102. For example, the portable program module 104 may initially determine the size of its associated iFrame so as to determine how many results it can display, and in what format it can display them. For example, if the iFrame is very short, there may no be room for graphics (e.g., photos of items in an auction), and the portable program module 104 may decline to display the graphics in such a situation.

In addition, the portable program module 104 may determine that the iFrame is too small to display a full description of multiple items, and may thus choose to concatenate certain descriptions or to display only a subset of fields received from the ISS, such as displaying only a "short description" field for an item. Also, the portable program module 104 may choose to display more items than will fit in the iFrame, and may provide a scroll control to permit access to items that will not initially display. The portable program module 104 may perform other formatting operations also, such as expanding outside of the iFrame to show more items.

The gathering of information from the container document 102, the submission of that information to the ad servers 106, the receipt of descriptive information about the container document 102 from the AD, the submission of a query to the ISS, and the receipt and display of results from the item search system 108, may all occur, in appropriate implementations, while the page associated with the container document 102 is being loaded. As such, the display created by the portable program module 104, such as an actively generated advertisement, may be viewable by a user almost immediately upon accessing and loading the associated web page.

The portable program module 104 may also be provided with additional functionality for accessing information for display with the web page. For example, calls made by the portable program module 104 may be conditional or iterative. As one example, the portable program module 104 may request a limited number of results, and when displaying those results, may display a control by which a user may seek additional results. In such a situation, the portable program module 104 may then request the additional results. (The portable program module 104 could also obtain all of the results initially and store some of the results until the user requests them.) The portable program module 104 may also determine, from information received from the ad servers 106, that multiple item search systems 108 may be possible sources for an advertisements. In such a situation, the portable program module 104 may generate a display showing a user the various choices of item search system 108, and may then perform a query of a particular item search system 108 upon selection of such an option by the user. It should be appreciated that various functions provided by a language such as JavaScript and JavaFX may also be implemented by the portable program module 104, thus enabling a rich array of interactions.

The display produced by portable program module 104 may include metadata, such as hyperlinks, that permits a user to interact with the results. For example, text displaying certain items in an on-line auction may be associated with a hyperlink whose selection causes a browser displaying container document 102 to be redirected to a page showing details about the item (or causes a new pane or new window to be open to display the item detail screen).

Selection of such a hyperlink may also cause a message to be transmitted to ad servers 106 or a server associated with ad servers 106, so as to report the user's selection. For example, an advertising system may bill advertisers based on the number of times that users click on a particular advertisement, and such a message may permit an ad system to properly bill an advertiser, such a the operator of item search system 108. In addition, portable program module 104 may report back the particular item the user selected within the display, so that more detailed reporting and billing may occur. As one example involving an on-line auction system, the seller of an item may be billed by the item search system 108 operating the auction if a user clicks on a link for that item. The item may include an ID number assigned by the ISS, and the portable program module 104 may pass that ID number to the ad servers 106 when a user selects the item. The ad servers 106 may then provide the number to the item search system 108 at an appropriate time, such as at a time when the selection is billed to the item search system 108. In addition to using such information to pass on advertising costs to its users in a fair and tracked manner, the item search system 108 may use such information to help analyze the effectiveness of providing certain information in a display, among other things.

The requests by the portable program module 104 to the ad servers 106 and to the item search system 108 may be cached in certain implementations. Such caching may permit for increased performance, as the various requests described above may require relatively extensive searching and processing, particular when performed in very large numbers. For example, if a portable program module for an advertisement like that discussed above is placed on the front page of the www.nyt.com web site, there may be hundreds of thousands of page loads that would each require complete searching and processing by the ad servers 106 and the ISS. Caching may allow the search and processing to occur once, with subsequent requests being served simply by looking them up in the cache.

When such caching occurs, it may be implemented at various levels, including in the browser, at an ISP or corporate server, and at central information providers such as Google. At the browser, when a user returns to a web page (e.g., when returning to a newspaper's main home page after reading an article) that is a container for a portable program module like that described above, the module code may simply return the information that it obtained the first time the page was loaded. Caching at an ISP may avoid any need to hit the ad servers 106 or the item search system 108 at all after a first user seeks information from those sources. And caching at the ad servers 106 and item search system 108 does involve some load on those systems, but avoids the need to re-query and re-process in manners that could be much more expensive than simply looking for information in the cache.

Caching may be controlled to expire by various mechanisms, particularly when the data displayed by portable program module 104 is real time data like weather information and on-line auction information. For example, one may insert a timestamp of appropriate granularity to the GET request. In addition, where caching is used or could be used, portable program module 104 may be programmed to format items in anticipation of such caching. For example, if an on-line auction system reports time remaining in auctions as "3 minutes remaining", the portable program module 104 may be programmed to reformat such information into an absolute, rather than relative time, e.g., "expires at 2:23 pm CT."

Figure 2A:
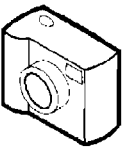
FIGS. 2A-2C are example displays of gadget advertisements that can be produced by the system and process of FIG. 1.
Figure 2B:
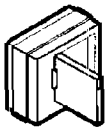
Figure 2C:

FIGS. 2A-2C are example displays 202-206 of gadget advertisements that can be produced by the system and process of FIG. 1. In this particular implementation, the displays show an ad that has been selected to match the context of a page, where for example, the page related to computer peripherals of some sort, so that the selected ad is for HP computer peripherals. The page also could have been directed to a topic such a digital photography, where the various portions of the interactive ads shown in displays 202-206 are also relevant to digital photography. Each of the displays 202-206 is a display that a user may select to have shown with the ad, and a user may also make selections of hyperlinks on the ad to be taken to an HP web site.

Similar displays may be generated as part of an ad simulator program by which a user may be provided menu selections to identify a size for an advertisement along with a target container document to be associated with the advertisement. Thus, for example a portable program module can submit a particular URL selected by a user to an ad server, and the ad server may have previously analyzed the relevant URL page, such as through a crawling process for indexing of the page, such as part of the AdSense process for analyzing and classifying page content. Such an analysis may have determine that the concept or keyword of "digital camera" was the most relevant concept or keyword for that page. As a result, the ad server may have returned such a keyword to the portable program module, and the portable program module may have caused the displays shown here to be generated.

In other embodiments, keywords may be submitted to a site such as eBay, which may return at least one digital photograph for the portable program module to display with the ad. Text associated with the ad, which may be coded right into the portable program module can emphasize to the user that the displayed information is real time information for auctions that are currently occurring (or have occurred in the recent past). Each item displayed for the auctions may also be provided as a hyperlink, so that a user can readily see that the ad is interactive, and that selection of the relevant hyperlink will take them to a details page for the corresponding auction.

In this manner, the user can be presented with a display by which they will know immediately that they can reach a desired auction without any effort. Specifically, they will not need to enter additional search requests after clicking on an ad and being taken to the eBay web site. As a result, the presentation of an ad shown here may cause the user to react in a much more positive manner, i.e., to appreciate the ad more and to be more likely to click on it. As a result, the user may benefit by being directed to information that interests them, the advertiser eBay (and its corresponding camera sellers) benefit by driving additional traffic to auctions, a syndicator of the advertisement can benefit by generating ad revenue, and the producer of the container document can benefit by sharing in advertising revenue and having a more pleased user base.

Figure 3:
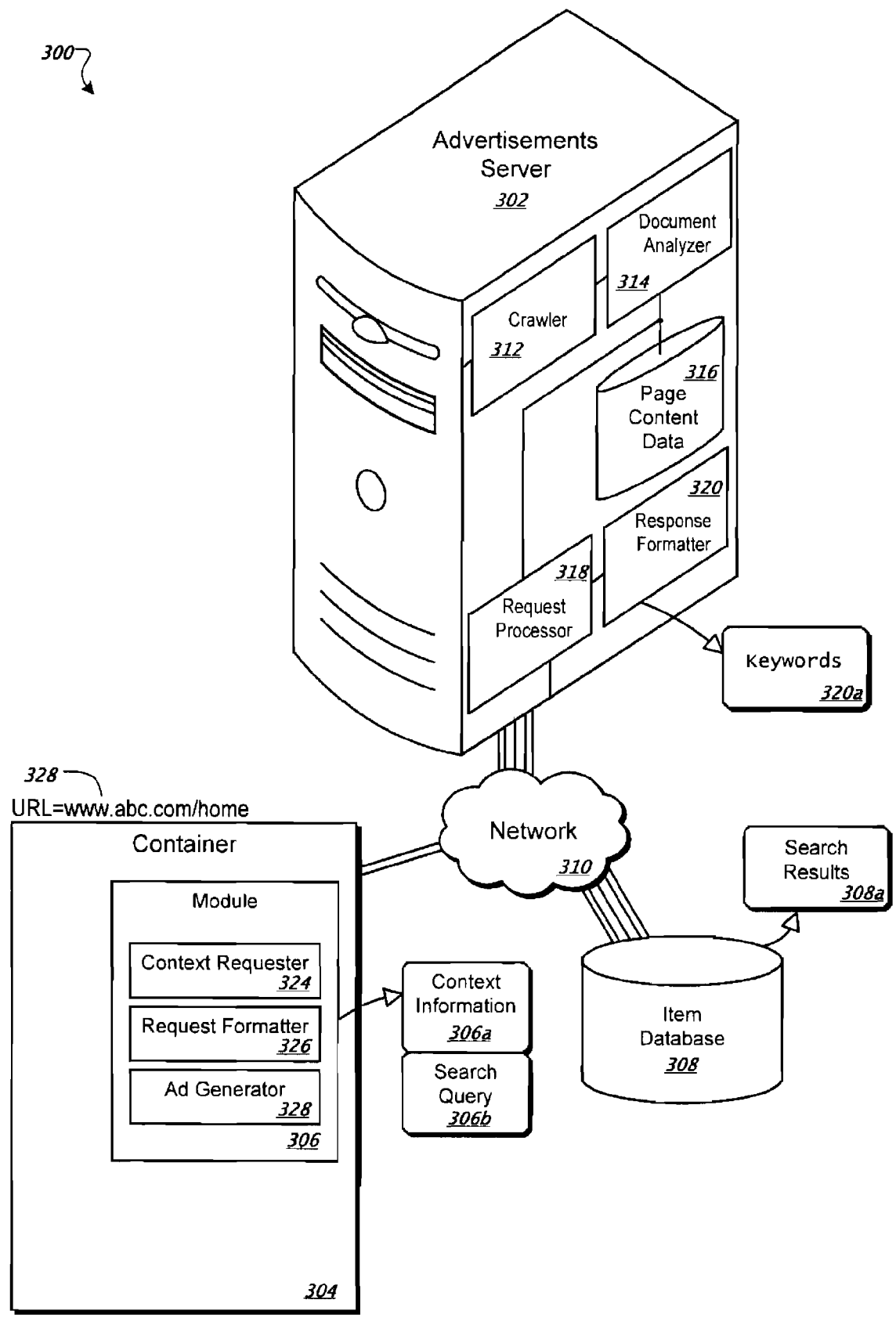
FIG. 3 is a schematic diagram of an example system for delivering content in real time to portable program modules.

FIG. 3 is a schematic diagram of an example system for delivering content in real time to portable program modules. In general, the components shown in FIG. 3 may take a form similar to those shown in FIG. 1. Additional detail and structure for certain of the components is shown here for additional illustration of the operation of an example system 300.

The system 300 is generally made up of a portable program module 306 in a container document 304, that may access information through a network 310 such as the internet, from an ads server 302 and an item database 308. The container document 304 may have a number of parameters associated with it, including its URL 323. The portable program module 306 includes code and a resulting display that is embedded in the container document 304, and may include code that is referenced from the container document 304. As described above, the portable program module 306 may be implemented to provide a display in an iFrame on a web page associated with the container document 304.

The portable program module 306 includes a number of components that permit it to obtain information about the container document and to retrieve and display content such as a dynamically generated ad using such information. For example, context requester is a program module that communicates with the container document 304, such as by communicating with a browser program displaying the container document. The context requester may obtain various parameters that define the context of the portable program module 306, such as a URL 323 for the container document 304 and a size of a frame in which the portable program module 306 is to be displayed, among other things.

The portable program module 306 also includes a request formatter 326. The request formatter 326 may be used to generate requests for the ads server 302, such as using context information (e.g., a container document URL) obtained by context requester 324. In addition, the request formatter may receive responses from the ads server 302, and use information in such responses to generate a request or requests to the item database 308, e.g., a query designed to generate a list of items showing real time information tracked by item database 308, for display by portable program module 306.

In addition, the portable program module 306 can also include an ad generator 328. The ad generator receives information such as that returned from item database 308, including real time information, and formats the received information for display on a web page associated with the container document 304, in manners like those discussed above.

The portable program module 306 can generate various forms of messages to be communicated to and over the network 310. Message 306a is a message, in the form of a request (e.g., HTTP request) to ads server 302 including context information relating to the context of the portable program module 306 that has been gather by the portable program module 306. Message 306b is a search query, which may be submitted in a form according to a standard API to item database (or to a web server associated with item database 308).

Item database 308 itself may take a variety of forms consistent with the techniques described here. In certain implementations, item database 308 may track real time, constantly changing information. In such implementations, portable program module 306 can be used to gather such information and dynamically generate content such as advertisements, to be displayed on a web page associated with container document 304. The item database may generally be configured to generate messages in the form of search results that are responsive, for example, to search queries from the portable program module 306. Other messages may also be generated and transmitted by item database 308 as appropriate.

Ads server 302 may include a number of components and structures for supporting the generation of targeted advertisements to viewers of internet web pages. The ads may be generated for inclusion on pages of an organization that operates the ads server 302 (e.g., search result pages) or may be generated for inclusion through a syndication program on third party web pages. As with the other devices here, the ads server 302 may include one or more different computers and/or computer systems; the particular grouping of modules and structures is shown here simply for illustrative purposes.

The ads server 302 receives messages from other components at a request processor 318. The request processor 318 may parse and analyze incoming messages to determine how to respond. For example, an incoming message may request a list of certain concepts or keywords associated with a particular URL, and the request processor 318 may analyze the structure of such a request to determine that certain identifying information about a web page associated with the URL should be returned. As such, the request processor 318 may access page content data 316, which includes information that correlates particular URL's to concepts or keywords. The accessing may be through a simple look up that uses the URL as a key.

The page content data may be generated in the first instance by a document analyzer 314 using a crawler 312 to obtain page information. The crawler may operate through various mechanisms to automatically and periodically survey information available through network 310. The document analyzer 314 may review information collected by the crawler 312, and may determine concepts or keywords for the information using mechanisms like those discussed above. The document analyzer may also obtain URL's for various documents that it analyzes from the crawler 312, and may store the URL's and the corresponding concepts or keywords in page content data 316 for later access by the system. In addition, the crawler 312 and document analyzer 314 may obtain and analyze information in real time, such as where a request is made for a URL from the portable program module 306 and a corresponding URL does not yet appear in the page content data 316.

When responses have been generated, they may be returned to a requester by response formatter 320. The response formatter 320 may, for example, reformat database results received from a query of the page content data 316 into one or more XML messages to be returned to the portable program module 306. The messages may include, for example, keywords 320a. Various other services may also be provided by ads server 302, though limited services have been shown here to increase clarity. For example, static ads may be served up by ads server 302 and may be delivered for display on a web page associated with container document 304—without the need to reference a separate source of real time information like item database 308. Other services may also be provide, as may be described more fully with respect to FIG. 7 below.

Figure 4:
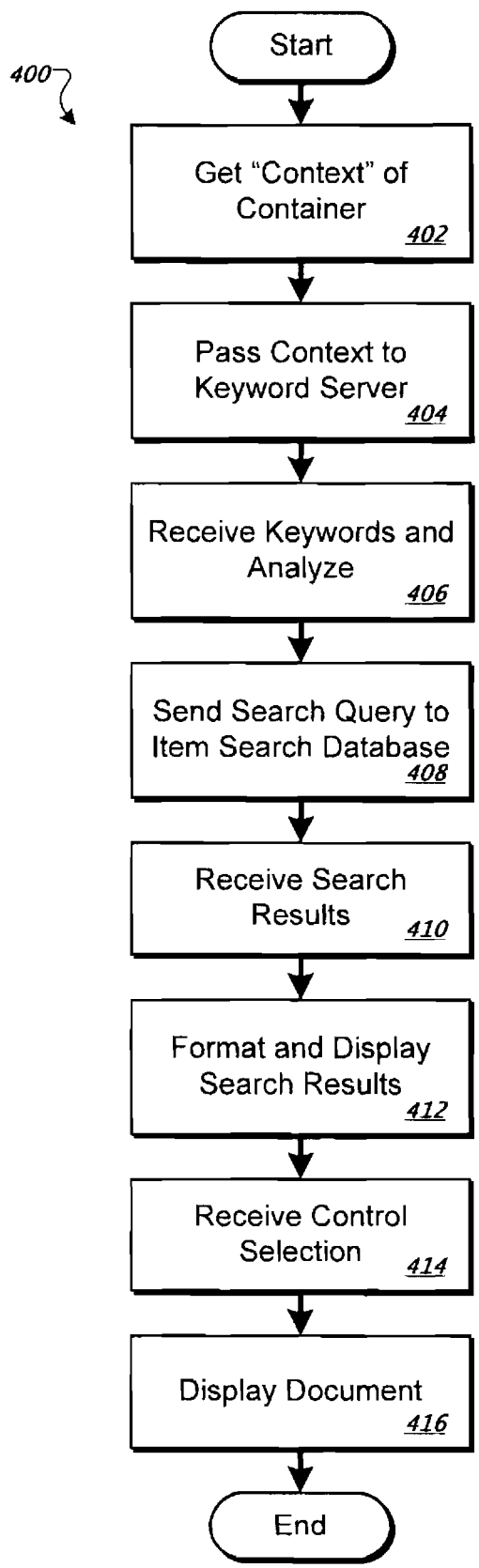
FIG. 4 is a flow chart of a process for generating an embedded advertisement exhibiting real time data.

FIG. 4 is a flow chart of a process 400 for generating an embedded advertisement exhibiting real time data. In general, the process shows actions that may be taken by a portable program module in gathering and displaying information to a viewer of a web page. The process broadly involves gathering information from a document, such as a container document, related to the portable program module, submitting the gathered information (or a derivative of the gathered information) to a remote server, receiving information from the remote server in response (e.g., information providing information that is descriptive of the related document), submitting the received information (or a derivative of the received information) to another remote server, receiving information in return from the other remote server, and displaying the received information.

At box 402, the portable program module initially obtains information about a "context" of the portable program module and/or a container document for the portable program module. The context may include many different sorts of information, and may include, for example, text of a main heading in the container document, a URL for the container document, a set of links in the container document, etc.

The portable program module then, at box 404, passes the context information to a remote server such as a keyword server. The portable program module may first alter or otherwise reformat the context information, such as by adding certain parameters to the information, where the parameters may be used by the remote server to determine what actions to take with respect to the submitted information. The remote server may use the passed information to generate a response, such as by identifying information that is descriptive of a container document when a URL of a container document is passed to the server. The server may then pass back such information, such as in the form of keywords, to the portable program module, as shown by box 406.

At box 408, the portable program module sends the keywords to an item search database. The portable program module can analyze the received keywords, and may add to them, alter them, or simply pass them on without any change other than perhaps a formatting change (e.g., from XML to HTTP request that matches an API for the item search database). In addition, the portable program module may make other determinations, such as by selecting an item search database, from multiple such databases, to receive the query. The portable program module may then wait while the item search database applies the submitted query to its data and generates a response. The response may include, for example, one or more items responsive to the query.

At box 410, the portable program module receives the results from the item search database, and at box 412, it formats and displays the search results. The formatting may include eliminating certain of the results for display, and also determining the form or size of the space for the portable program module and arranging information regarding the returned items so as to fit in the allotted space.

The portable program module may then wait for an action. At box 414, the portable program module receives a control selection, such as by a user clicking on a hyperlink representing an item displayed by the portable program module. The selected hyperlink may cause a browser that is displaying the portable program module to display to the user a detail page that is the target of the selected hyperlink. By this process, a centrally located portable program module may coordinate the passing of information needed to gather data for displaying a dynamically rendered advertisement, and to display such an advertisement for interaction with a user.

Figure 5:
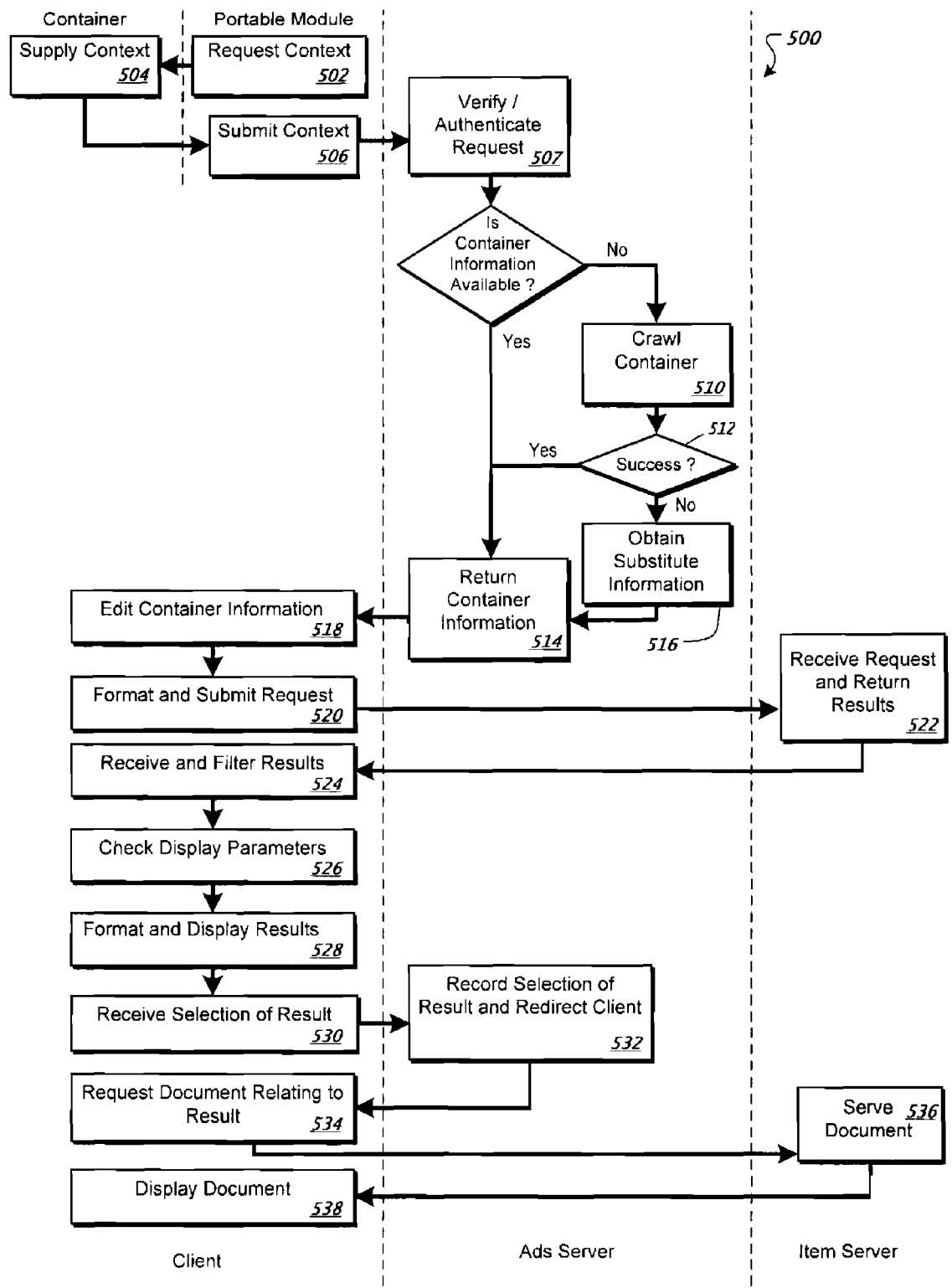
FIG. 5 is a swim lane diagram of a process for generating an embedded advertisement exhibiting real time data.

FIG. 5 is a swim lane diagram of a process 500 for generating an embedded advertisement exhibiting real time data. In general, the process 500 shows an example of interactions between a client device, an ads server, and an item server, which may be structures like those shown in FIGS. 1 and 3.

The example process begins at box 502, where a portable module on a web page on the client requests information about the context of the web page. The container document or another appropriate structure responds by providing contextual information (box 504), such as a URL of the document. The portable module then submits information relating to the context (e.g., the URL) to a remote server such as an ads server (box 506).

Upon receipt of the request, the ads server may initially authenticate the request (box 507), such as to ensure it is not spam. The server then determines whether information that is descriptive of the container document is available, e.g., whether keywords or concepts describing the page content have previously been generated for the document and stored by the server. If such information has been stored, it can simply be returned to the client (box 514). In addition, if a request for the same information has recently been made, a cache may intercept the request and answer it, without the need for additional searching on the server (not shown).

If such information for the container document is not available, the ads server may cause the container document to be crawled by a web crawler (box 510) and then analyzed to generate new keywords in runtime. If crawling and analysis is a success (box 512), the newly generated keywords may be returned to the client (box 514). If the crawling and/or analysis does not generate information that can be returned to the client, the ads server may obtain substitute information for describing the container document (box 516). For example, the ads server may gather keywords for all documents in the same domain or same path as the container document, and identify a particular keyword or keywords that are dominant among the gather keywords. When substitute information has been gather, it may be returned to the portable program module as information about the container document (box 514).

At box 518, the portable program module edits the received information, such as by selecting certain keywords to pass to the item server, or by simply reformatting the received information into a request that matches a format that is acceptable to the item server. At box 520, the client finishes reformatting the request and submits it to the item server, which receives the request and returns results corresponding to the request (box 522). The item server may operate according to the various procedures discussed above or according to other appropriate processes.

The client then receives the results at box 524 and filters them or otherwise changes them, such as by are or eliminating certain results that are determined to not display properly with the container document. In making a decision of what results to display, and how to display them, the portable program module may check display parameters, such as the size of an iFrame or similar structure in which the display is to occur (box 526). The client may then format and display the results (box 528), such as is shown in, for example, FIG. 2.

After a time, a user may select one of the results displayed by a portable program module (box 530), which may cause an HTTP request to be delivered to the ads server (box 522) where the hyperlinks for the items are formatted to be directed to the ads server. The ads server may then redirect the user's client application (e.g., browser) to the item server (boxes 532 and 534). By having the item's hyperlink point to the ads server, and pointing the browser to the item server by redirection rather than directly, the process 500 may give the ads server notice that the item has been clicked on, so that the ads server may bill the advertiser for the click. In other circumstances, the advertising may be billed differently, such as by a cost per impression billing technique.

At box 534, the client requests a document relating to the result returned by the ads server. The requested document may be a document generally, or may more specifically involve submitted a query to the item server. The item server may then serve the requested document (box 536), which serving may involving querying a database of real time changing information, and returning matching items from the database. Finally, at box 538, the client displays the document, which may involve formatting XML-based data received from the item server for display on a web page, such as in a gadget.

Figure 6:
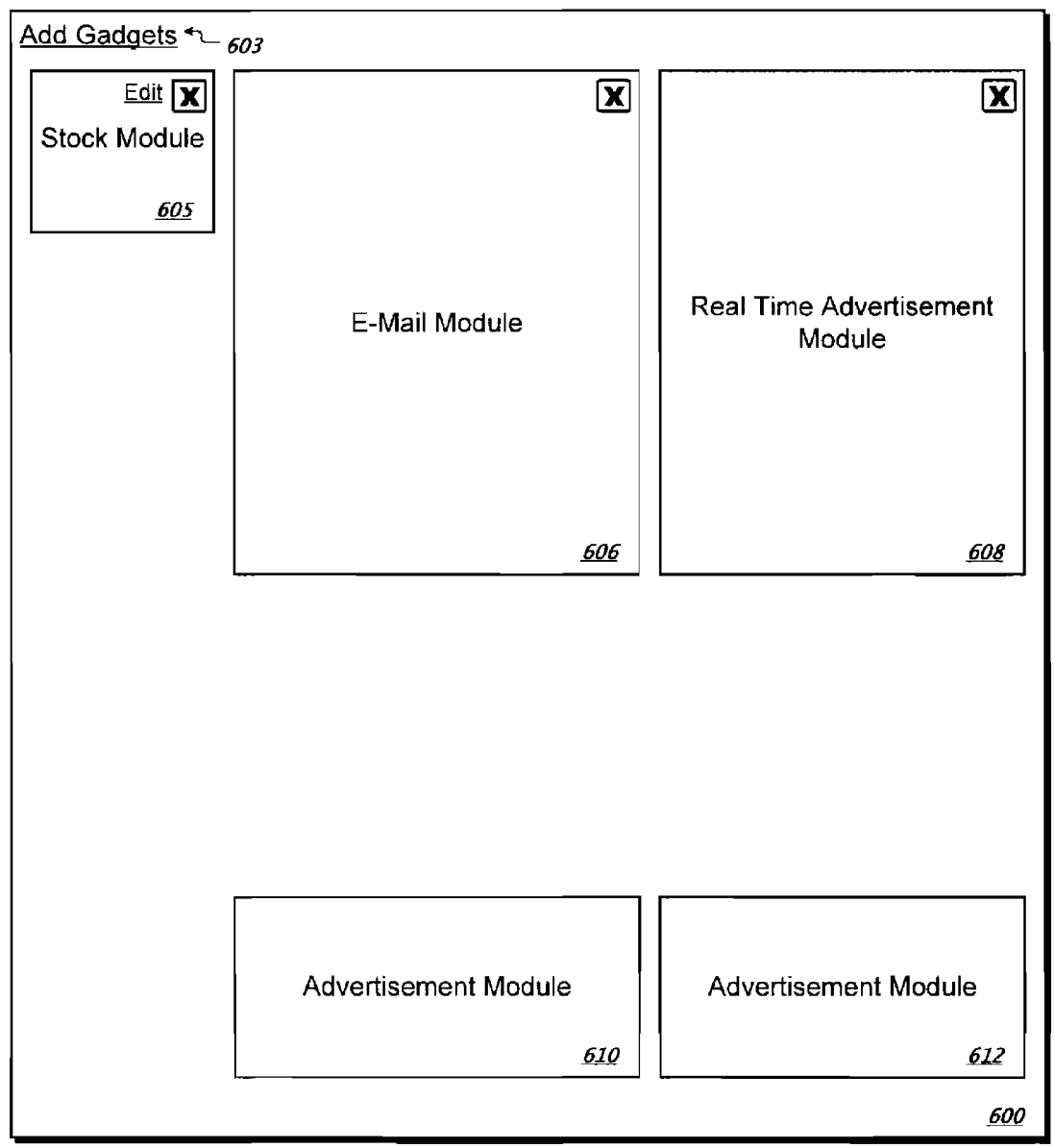
FIG. 6 shows an example layout of a container document that includes a number of portable program modules.

FIG. 6 shows an example layout of a container document 600 that includes a number of portable program modules. A number of methods of incorporation are possible, including the use of the iFrame and inline HTML techniques. FIG. 6 depicts a plurality of modules including a stock module 605, an e-mail module 606, a real-time ad module 608, and ad modules 610, 612. Different formats for the various modules may exist depending upon the specifications provided by the creator of the module. Some modules may provide scroll bars, and others may not. Some modules may be different sizes or shapes than other modules. In addition, some modules may offer an opportunity for the user to edit the display preferences and/or per-use data associated with the module.

In one implementation, inlined modules may be automatically sized by a container document so no scrolling, height or scaling information may be provided. If a module developer wants the module to have these properties in this embodiment, an inlined module may be wrapped with a fixed size <DIV> tag and content placed in the tag. The scroll bar, height, and other characteristics may be then specified for the inlined content. One of the attributes allows specifying scaling="..." to let the developer indicate how a module may be scaled up or down for different sizes of placements in the container documents.

One of the functions provided with this example container document 600 is the opportunity to add content to the container page through selecting the add content element 603. Upon selecting the "add content" element 603, the system may offer the user the opportunity to interactively indicate an additional element to be included in the container page. Various forms of an interface to receive that input may be provided.

In addition, in adding, editing or deleting modules, it may be desired to have those activities occur without a refresh of the container document. One illustrative technique for achieving this may involve use of AJAX programming techniques so a module may be added to a container document without a refresh of the container document page (perhaps only a refresh of the IFRAME in which the new container is presented), or use of AJAX to remove a module without the container document being refreshed or when a developer is developing a module, being able to change modules without the container document in which they are populated having to have a page refresh in order to incorporate the changed module.

Figure 7:
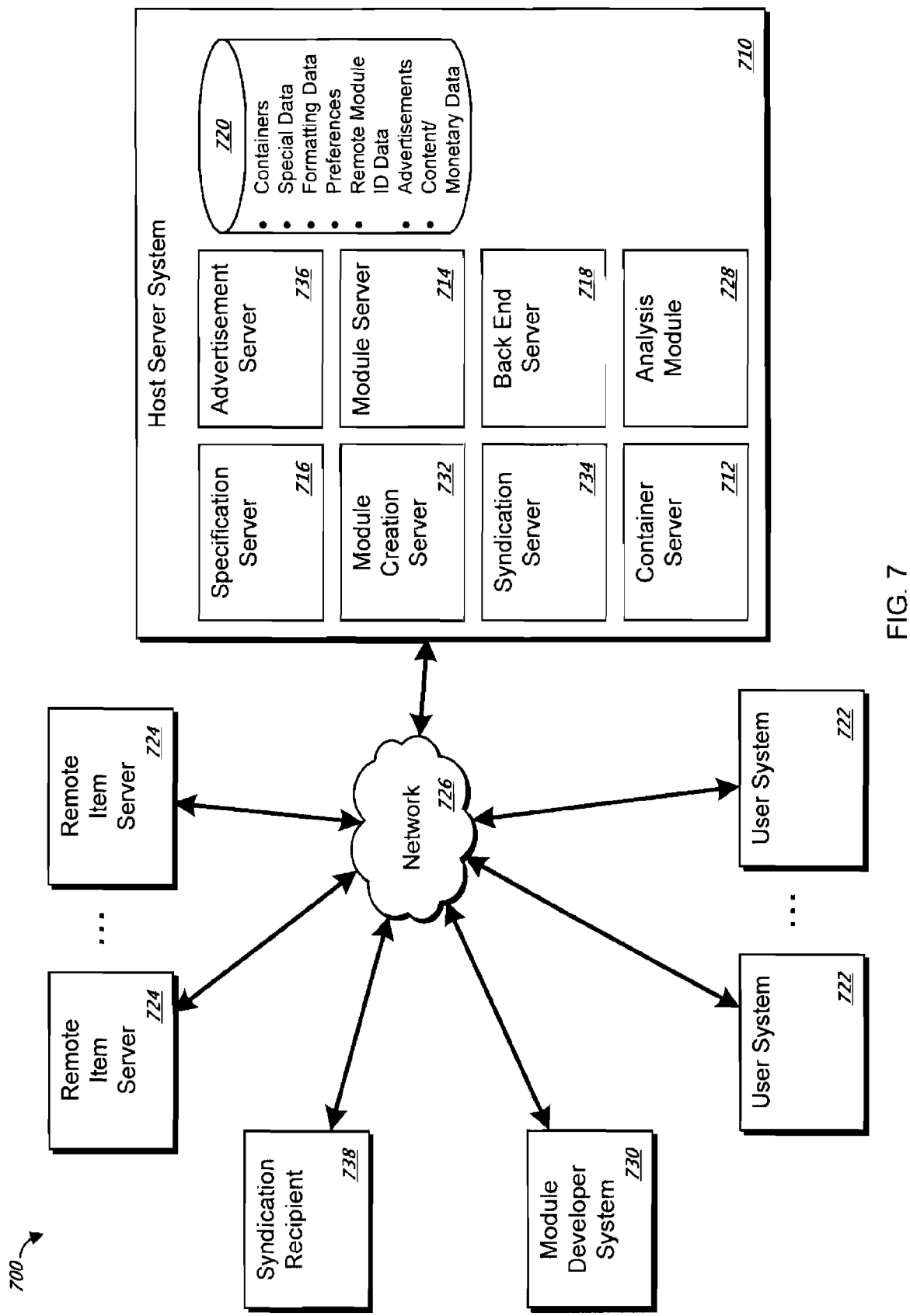
FIG. 7 is a schematic diagram of an example system for dynamically generating advertisements and other items.

FIG. 7 is a schematic diagram of an example system 700 for dynamically generating advertisements and other items. In general, the system 700 is a more general representation of a system that employs portable program modules, such as gadgets, for various operations. The general operations described here are, when appropriate, applicable to the systems shown in FIGS. 1 and 3. System 700 may include a host server system 710 with a plurality of modules that may be associated therewith. Such modules may comprise a container server 712, a module server 714, a specification server 716, a back end server 718, an analysis module 728, a module creation server 732, a syndication server 734, and an advertisement server 736. As illustrated, host server system 710 may connect over a network 726 to a plurality of other systems or sub-systems.

Other systems connected to the network may comprise one or more user systems 722, one or more remote item servers 724, one or more module developer systems 730 and one or more syndication recipient servers 738. In addition, one or more database systems 720 may operate in conjunction with the various modules of host server system 710.

Container server 712 may serve container documents to user systems 722 over network 726. Container server 712 may use a web server or related server systems that take data and/or instructions and formulate containers for transmission over the network to the user system 722. However, that container server 712 may reside on user system 722 as well, so that a network connection may not be used. In the example in which the container document includes a word processing document, for example, container server 712 may comprise a word processing module.

Module server 714 may provide data from modules to container server 712 for incorporation into a container document. In one embodiment, container server 712 and module server 714 may comprise a single unit performing both functions, as may other servers and modules described herein. Module server 714 may provide data for the container document by interpreting and/or parsing instructions in a module specification associated with the module. According to one embodiment, module server 714 may serve the module content to the container document through the use of a browser iFrame.

To expedite display of container documents, modules may be displayed inline within the container document. Inline display may be understood as referring to display with other document elements. One example is a display generated from code for HTML in the body according to HTML standards. In one embodiment, module server 714 or some other component may determine whether the module is deemed trusted prior to including it in the container document due to the risks of various security issues an inline module could create. According to one embodiment, the module may incorporate an indicium of approval (e.g., digital certificate) issued by the container module or an entity associated with the container module. If the indicium of approval is present, module server 714 may render the data from a module for inline presentation in the container document.

Specification server 716 provides a module specification file to module server 714. The module specification may be cached and stored in a database accessible to the module server 714 and/or specification server 716 or may be retrieved from a location associated with the specification as detailed later. For example, specification server 716 may reside on a remote item server 724. In addition, specification server 716 may be connected to module server 714 over a network with the module specification located at another location on the network accessible to specification server 716.

Backend server 718 may be provided for interacting with one or more databases (e.g., large or dynamic databases of information). For example, for a news module that obtains frequent updates and demands a flow of data, (e.g, from an RSS feed), backend server 718 may format the data into HTML for the container.

In one specific example, a person may create a module (e.g., a maps module), such as one that uses an application program interface (API) to an existing mapping program to create a module to display a map of downtown Mountain View, Calif. The module may include an XML specification file or module specification file stored on a specification server. The specification server may comprise any appropriate server, including one on a site from which the container page is hosted. The user or another person may then include this new module on a personalized homepage or another form of web page (container document). The server that serves the container document may operate as the module server, and the server that generates the mapping data through an inquiry from its API may be considered to be the backend server.

In one implementation, analysis module 728 may analyze modules at various times (e.g., when the module is first selected by a user, each time the module is called by a container for inclusion or at any other time determined to be advantageous for safety and security and other times). Analysis module 728 may perform a number of actions, including comparing the module with a list of disapproved or dangerous modules or a list of approved modules. The comparison may involve exact or substring (e.g., prefixes, suffixes and regular expressions) matching by name or location (e.g., URL), contents of the specification, contents of the location where the specification resides, or information that may be ascertainable about the module.

Analysis module 728 may take one or more actions in response to a determination that the module is disapproved or dangerous, including, for example, silently blocking the request, (i.e. providing a generic error), blocking the request with an error that explains the reason it was blocked or redirecting the request to a different module specification that has been determined to be safe and related to the disapproved module (e.g., another module that relates to maps, if the first one was a disapproved mapping site or a module that includes the keyword "basketball" if the disapproved module was a basketball module). For example, through redirection, the URL of the original module may be passed to the "safe" module. The safe module may then use a proxy server, as described below, to retrieve the original URL's content. Developers may then replace the error handler to fix small bugs in the original module to be able to display the content of the original module. In another embodiment, analysis module 128 may parse the module content to determine whether it is safe, such as by compiling JavaScript or other scripts contained in the module to try to identify unsafe or undesired actions the module may perform.

One or more module creation servers 732 may be provided. These servers may operate as "wizards" to enable module creators to create a module through an interactive process. For example, module creation server 732 may provide a series of user interfaces that enable a person creating a module to provide inputs that are used to automatically generate a module specification. For example, various module specification templates may be provided with corresponding inputs. Module creation server 732 may then take inputs supplied by a user, insert them into a template, and generate a module specification for the module. A preview, testing, and debugging function may also be offered as part of this "wizards." This module may be downloadable to a client as well.

A syndication server 734 may prepare data for transmission to one or more syndication recipient servers 738 related to modules. Syndication server 734 may receive a request for a module and/or module content and deliver that module or content to a syndication recipient server 738 over network 726. Syndication server 734 may reside at host server system 710 or at another location on the network.

For example, if an operator of a sports web site (an example of a syndication recipient system 738) desires to include an advertising module created by a remote source system, it may do so through a request to syndication server 734. Syndication server 734 may then cooperate with module server 714 to generate data for the container document (here the sports web site page of the syndication recipient system 738). That may involve retrieving the module specification from the remote source system, supplying preferences received from the syndication recipient server 738 (e.g., city information for the sports team of a page being displayed) and/or generating data for the container. It is also possible that the data may be rendered at syndication recipient server 738 into its container document in either an IFRAME or inline. Syndication server 734 may thus syndicate modules accessible to it. It may do so based on requests for specific modules or other criteria it determines (e.g., content matches, keyword matches, monetary values associated with modules and/or syndication requestors, etc.).

Ad server 736 may provide advertisements associated with modules to containers and/or data for creating a display for such modules. For example, an advertisement may be incorporated with module data when data is delivered to a container document. Ad server 736 may operate with syndication server 734 to deliver advertisements to syndication recipient servers 738 based on a syndication request for a module. The advertisements may be selected by ad server 736 based on a wide variety of criteria, including, but not limited to, the relationship between the content of or information about the container, module, other modules in the container, syndication recipient server information, monetary elements/relationships related to any of the foregoing and/or combinations thereof. Ad server 736 may comprise the Google AdSense system, according to one embodiment of the present invention. Ad server 736 may manage online advertising by associating two or more concepts-related to a module with an advertisement and associating a bid, collectively, with-the two or more keywords. In addition, syndication server 734 or ad server 736 may respond to requests from syndicated modules such as advertising related-modules that send requests for information describing container pages associated with the modules.

One or more database systems 720 may be provided that store, in any number of appropriate manners, container information, module specifications and/or related information, formatting data, per-user and per-module preference data, remote module ID data, remote module location reference data, advertisement data, advertiser data, content/monetary data, syndication recipient data, templates for modules, inputs for modules, lists of trusted and untrusted modules, approval criteria and related information and/or any other information used by the modules to operate as described herein. While a single database structure is shown, the data may be stored at a number of locations and in one or more systems.

In one implementation, systems and method are provided to incorporate modules into a container document. One example of a container document would be a personalized home page, such as the Google Personalized Homepage currently available to users of the Google services on the Internet. Instead of restricting the types of content that a user is able to include in a container document such as a personalized home page, one or more embodiments of the present invention enable users to select modules from sources other than the source of the container document. So, for example, a user may elect to include a module in his or her personalized Google home page from a source not associated with Google.

Figure 8:
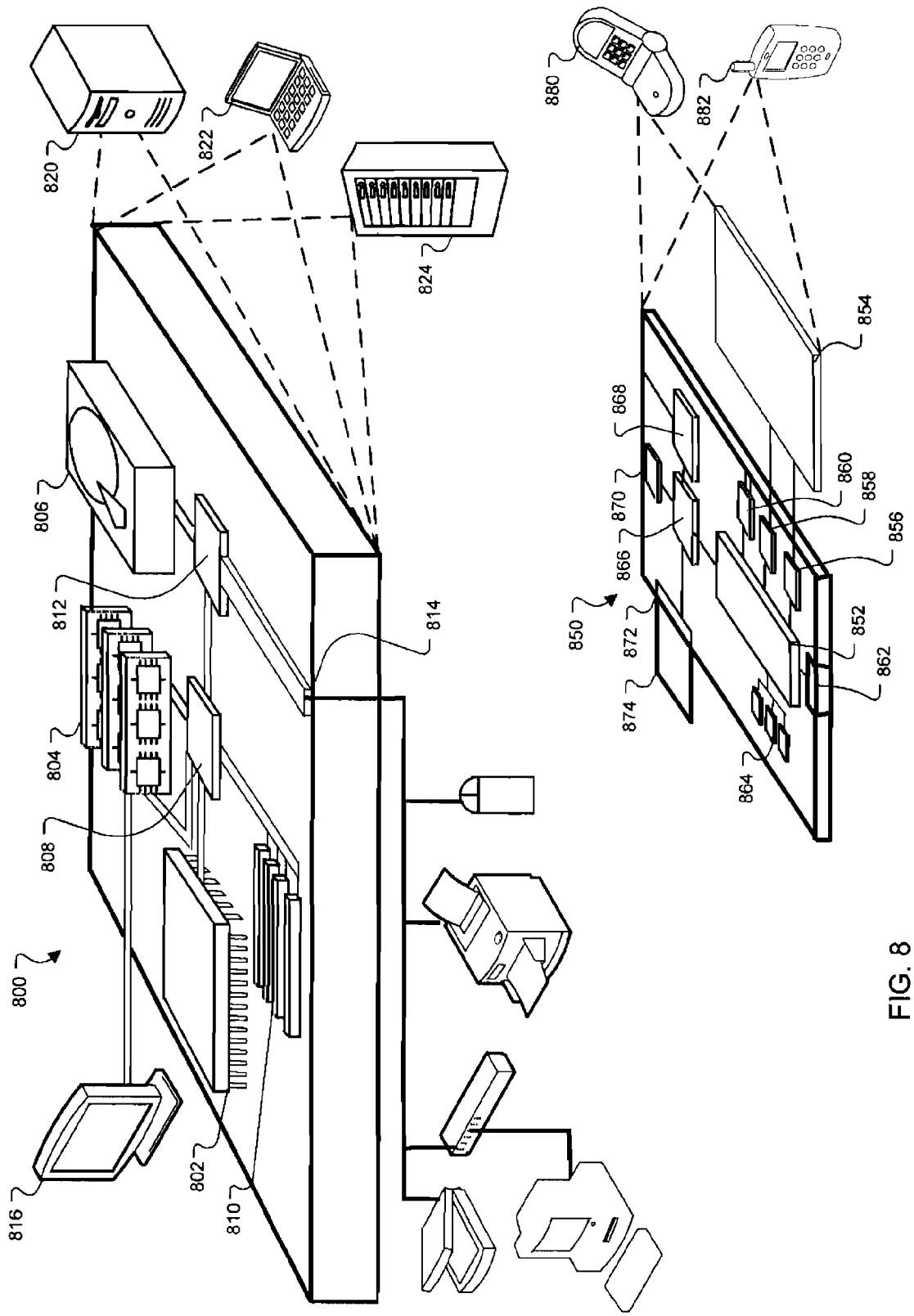
FIG. 8 shows an example of a computer device and a mobile computer device that can be used to implement the techniques described here.

FIG. 8 shows an example of a computer device 800 and a mobile computer device 850 that can be used to implement the techniques described here. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, memory on processor 802, or a propagated signal.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, memory on processor 852, or a propagated signal that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, container document 102 MA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Figure 9A:
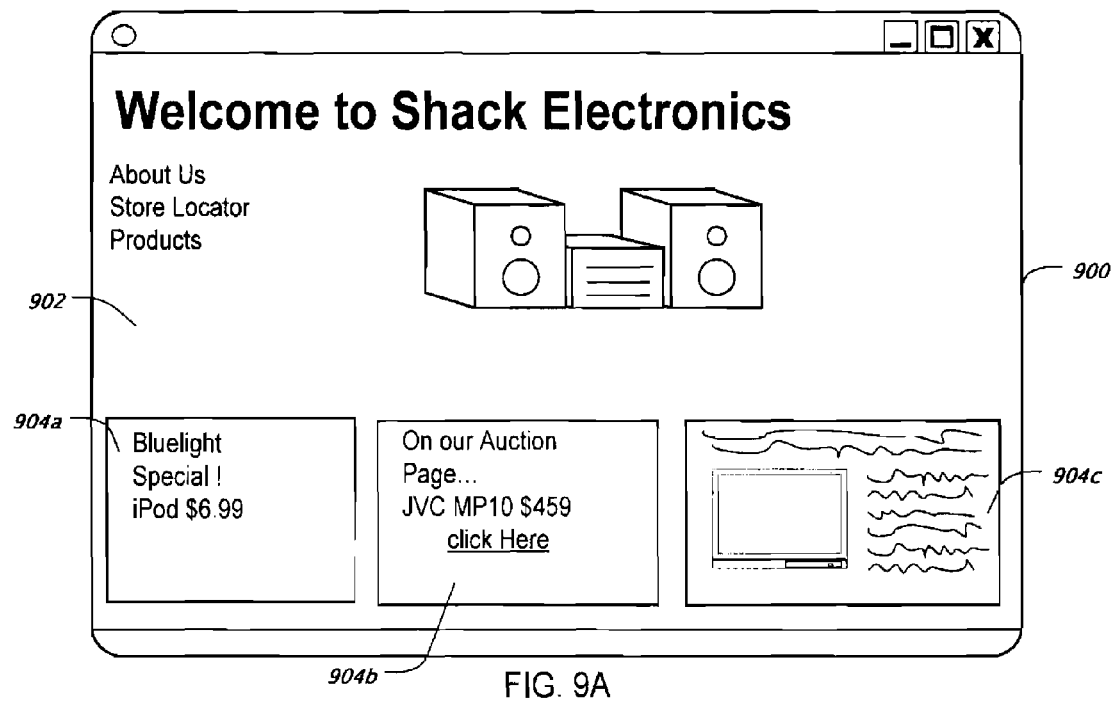
FIGS. 9A and 9B are displays of web pages that include portable program modules for displaying dynamically generated advertisements.
Figure 9B:
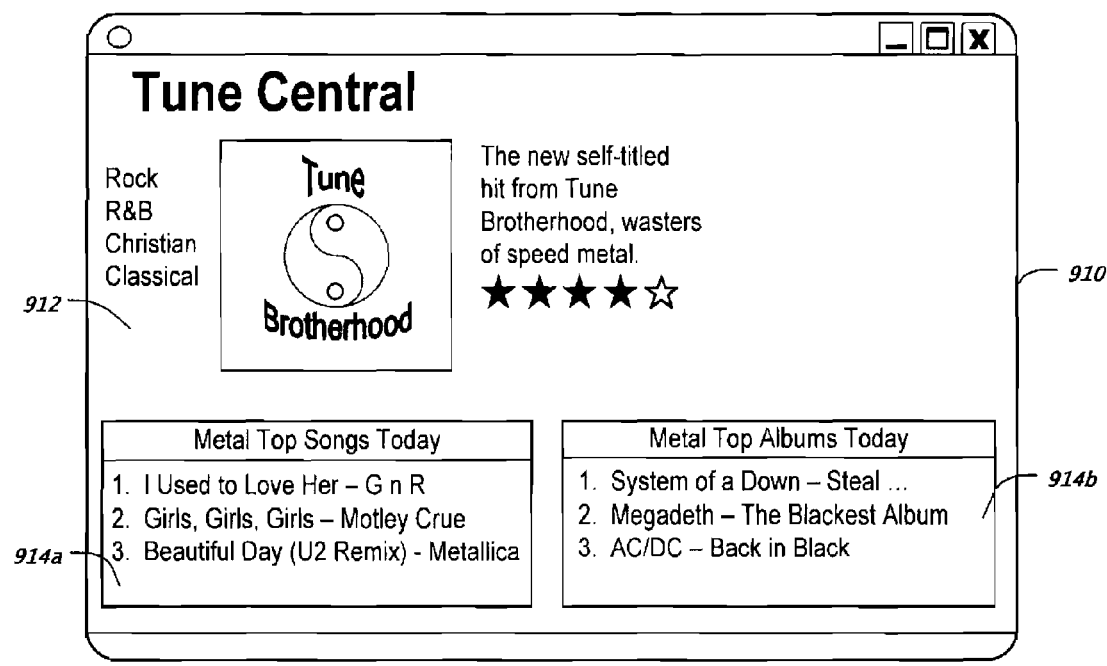

FIGS. 9A and 9B are displays 900, 910 of web pages that include portable program modules for displaying dynamically generated advertisements. The displays 900, 910 are provided to show additional mechanisms by which the concepts discussed above may be implemented. The description of additional implementations should not be taken as an indication that the discussion is limited to particular techniques or only to the specific techniques that are shown.

Display 900 shows a web page for an electronics retailer, where one or more dynamic advertisements are displayed on the page. The display 900 includes a web page body 902 where standard information about the company's products is displayed, such as a particular product that is on special and the like. Several advertisements 904a-c are shown at the bottom of the display 900. The advertisements 904a-c may take a variety of forms, including targeted and non-targeted ads, or static and dynamically-created ads. Advertisement 904c is a static advertisement, in that in includes content that is selected beforehand by an advertiser, and it does not change its display from time to time based on data determined at or near the time of display.

Advertisements 904a-b are dynamically-created ads, in that certain content for the advertisements may be predefined, but other content is located and generated at or near the time of display. The dynamically-generated advertisements 904a-b may depend, for their content, on their content and on real time information. For example, advertisement 904a may be generated busing the text on display 900 to determine what is being displayed on display 900, and then querying a database to obtain information on real time sales associated with such information. For example, analysis of display 900, which may be a container document for advertisement 902a, may show that a portable music player is being discussed there, so the portable program module that generates advertisement 904a may query a database that is constantly being updated with information that the company is trying to clear out, so as to find an iPod sale that is going on, and to generate an advertisement for the iPod sale. In a like manner, advertisement 904b may cause an on-line auction database being operated by the electronics retailer to be queried and may return results from such a query.

Display 910 shows, in its body 912, a sample internet music site. Standard controls are provided so that users can browse, select and purchase music. In addition, two objects 914a-b are shown at the bottom of display 910 to promote the most popular songs and albums, respectfully, being sold that day on the site relating to the genre being displayed in the body 912 of the display 910. In the example, object 914a, when it is to be displayed, may obtaining context information about the main page, such as a URL, and may pass it to a search engine. The search engine may note that the particular page is a heavy metal page, and may return "heavy metal" as an argument to the object 914a.

The object 914a may then submit that argument as a query to a database, such as to a database associated with the music store that tracks popularity of songs sold by the store, or to a third party server separate from the operator of the music store, to obtain, for example, national top singles information. Each displayed single may be shown as a hyperlink so that selection of the hyperlink causes the user to be taken to a details page for a particular song, where the user may purchase the song. Similar activity, but with respect to albums, is shown with respect to object 914b.

Various implementations of the systems and techniques described here can be realized in digital electronic circuitry, integrated circuitry, specially designed ad servers ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made. For example, various forms of the flows shown above may be used, with steps re-ordered, added, or removed. Also, although several applications of the content delivery systems and methods have been described, it should be recognized that numerous other applications are contemplated. Moreover, although many of the embodiments have been described in relation to real time, dynamically created advertisements, other content delivery may also be provided in other various forms. Accordingly, other embodiments are within the scope of the following claims.

What is claimed is:

1. A computer-implemented method, comprising:
   obtaining identity information, with a portable program module, for a source of a webpage associated with a container document, the portable program module located in the container document;

submitting, by the portable program module located in the container documents, the identity information to a concept server storing keywords associated with the container document;

receiving, by the portable program module located in the container document and from the concept server, in response to the submitted identity information, the keywords associated with the container document;

selecting, by the portable program module located in the container document, a subset of the keywords received from the concept server based at least on one or more criteria specified by an author of the portable program module;

submitting, by the portable program module located in the container document, a query to an item search server related to the subset of the keywords selected by the portable program module; and receiving, at the portable program module located in the container document, advertisements responsive to the query from the item search server for display.

2. The method of claim 1, wherein the advertisements are advertisements for on-line auctions.

3. The method of claim 1, further comprising displaying the advertisements within the container document, wherein the advertisements include one or more hyperlinks.

4. The method of claim 3, further comprising receiving a selection of one of the one or more hyperlinks and causing a web page associated with the hyperlink to be displayed.

5. The method of claim 3, wherein the hyperlink includes a query for return of content that changes in real time.

6. The method of claim 1, further comprising formatting the advertisements for the display.

7. The method of claim 1, wherein the identity information for a source of a webpage comprises a URL associated with the container document.

8. The method of claim 1, wherein the identity information associated with the container document includes one or more words representing concepts in text on the container document.

9. The method of claim 1, further comprising:
determining that an inventory associated with one or more products advertised through the container document has become exhausted, then, before obtaining the identity information, invoking the portable program module.

10. The method of claim 1, wherein submitting, by the portable program module, the query to an item search server comprises inserting the subset of the keywords received from the container document as arguments of the query.

11. The method of claim 10, further comprising determining, by the portable program module located in the container document, that the subset of the keywords received from the container document will obtain a result from the item search server.

12. The method of claim 1, further comprising providing, by the portable program module, the advertisements responsive to the query from the item search server.

13. The method of claim 1, further comprising selecting, by the portable program module located in the container document, the item search server from among multiple item search servers based upon the subset of the keywords selected by the portable program module.

14. A system, comprising:
one or more computers and one or more storage devices storing instructions that are operable, when executed by the one or more computers, to cause the one or more computers to perform operations comprising:

obtaining identity information, with a portable program module, for a source of a webpage associated with a container document, the portable program module located in the container document;

submitting, by the portable program module located in the container document, the identity information to a concept server storing keywords associated with the container document;

receiving, by the portable program module located on the container document and from the concept server, in response to the submitted identity information, the keywords associated with the container document;

selecting, by the portable program module located in the container document, a subset of the keywords received from the concept server based at least on one or more criteria specified by an author of the portable program module;

submitting, by the portable program module located in the container document, a query to an item search server related to the subset of the keywords selected by the portable program module; and receiving, at the portable program module located in the container document, advertisements responsive to the query from the item search server for display.

15. The system of claim 14, wherein the advertisements are advertisements for on-line auctions.

16. The system of claim 14, further comprising displaying the advertisements within the container document, wherein the advertisements include one or more hyperlinks.

17. The system of claim 16, further comprising receiving a selection of one of the one or more hyperlinks and causing a web page associated with the hyperlink to be displayed.

18. The system of claim 16, wherein the hyperlink includes a query for return of content that changes in real time.

19. The system of claim 14, further comprising formatting the advertisements for the display.

20. The system of claim 14, wherein the identity information for a source of a webpage comprises a URL associated with the container document.

21. The system of claim 14, wherein the identity information associated with the container document includes one or more words representing concepts in text on the container document.

22. A non-transitory computer-readable medium storing software comprising instructions executable by one or more computers which, upon such execution, cause the one or more computers to perform operations comprising:

obtaining identity information, with a portable program module, for a source of a webpage associated with a container document, the portable program module located in the container document;

submitting, by the portable program module located in the container document, the identity information to a concept server storing keywords associated with the container document;

receiving, by the portable program module located on the container document and from the concept server, in response to the submitted identity information, the keywords associated with the container document;

selecting, by the portable program module located in the container document, a subset of the keywords received from the concept server based at least on one or more criteria specified by an author of the portable program module;

submitting, by the portable program module located in the container document, a query to an item search server related to the subset of the keywords selected by the portable program module; and receiving, at the portable program module located in the container document, advertisements responsive to the query from the item search server for display.

23. The medium of claim 22, wherein the advertisements are advertisements for on-line auctions.

24. The medium of claim 22, wherein the operations further comprise displaying the advertisements within the container document, wherein the advertisements include one or more hyperlinks.

25. The medium of claim 24, wherein the operations further comprise receiving a selection of one of the one or more hyperlinks and causing a web page associated with the hyperlink to be displayed.

26. The medium of claim 24, wherein the hyperlink includes a query for return of content that changes in real time.

27. The medium of claim 22, wherein the operations further comprise formatting the advertisements for the display.

28. The medium of claim 22, wherein the identity information for a source of a webpage comprises a URL associated with the container document.

29. The medium of claim 22, wherein the identity information associated with the container document includes one or more words representing concepts in text on the container document.

* * * * *